(12) United States Patent
Shimomura et al.

(10) Patent No.: US 9,669,829 B2
(45) Date of Patent: Jun. 6, 2017

(54) TRAVEL LANE MARKING RECOGNITION SYSTEM

(71) Applicant: DENSO CORPORATION, Kariya, Aichi-pref. (JP)

(72) Inventors: Osamu Shimomura, Kariya (JP); Shunsuke Suzuki, Kariya (JP); Naoki Kawasaki, Kariya (JP); Tomohiko Tsuruta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/924,539

(22) Filed: Oct. 27, 2015

(65) Prior Publication Data

US 2016/0121889 A1 May 5, 2016

(30) Foreign Application Priority Data

Oct. 29, 2014 (JP) .................................. 2014-220558

(51) Int. Cl.
*B60W 30/12* (2006.01)
*G06K 9/00* (2006.01)
(Continued)

(52) U.S. Cl.
CPC ............ *B60W 30/12* (2013.01); *B60W 50/14* (2013.01); *G06K 9/00798* (2013.01);
(Continued)

(58) Field of Classification Search
USPC .............................. 701/41; 382/195; 348/148
See application file for complete search history.

(56) References Cited

U.S. PATENT DOCUMENTS

| 2004/0098196 A1* | 5/2004 | Sekiguchi | .......... B60K 31/0008 |
| | | | 701/301 |
| 2007/0047809 A1* | 3/2007 | Sasaki | ................ G06K 9/00791 |
| | | | 382/170 |

(Continued)

FOREIGN PATENT DOCUMENTS

| JP | 2005-149023 A | 6/2005 |
| JP | A-2005-149022 | 6/2005 |

(Continued)

*Primary Examiner* — Tyler Paige
(74) *Attorney, Agent, or Firm* — Knobbe, Martens, Olson & Bear, LLP

(57) ABSTRACT

An on-board camera captures an image of a travel lane ahead of an own vehicle. At least one state acquisition apparatus acquires an acquired value indicating a state of the own vehicle. A travel lane marking recognition system recognizes a travel lane marking that demarcates the travel lane from an image captured by the on-board camera. The travel lane marking recognition system sets a reliability level of the recognized travel lane marking based on the acquired value of the at least one state acquisition apparatus. When the reliability level is higher than a first predetermined threshold, the travel lane marking recognition system performs driving control of the own vehicle based on the recognized travel lane marking. When the reliability level is lower than the first predetermined threshold, the travel lane marking recognition system performs a deviation warning of deviation from the travel lane based on the recognized travel lane marking.

26 Claims, 3 Drawing Sheets

(51) Int. Cl.
*B60W 50/14* (2012.01)
*B60W 50/02* (2012.01)

(52) U.S. Cl.
CPC . *B60W 2050/0215* (2013.01); *B60W 2420/42* (2013.01); *B60W 2550/12* (2013.01); *B60W 2550/141* (2013.01); *B60W 2550/402* (2013.01)

(56) References Cited

U.S. PATENT DOCUMENTS

| | | | |
|---|---|---|---|
| 2007/0286475 A1 | 12/2007 | Sekiguchi | |
| 2009/0192683 A1* | 7/2009 | Kondou | B60W 10/18 701/53 |
| 2010/0076621 A1* | 3/2010 | Kubotani | G08G 1/166 701/1 |
| 2010/0231718 A1* | 9/2010 | Nakamori | G06K 9/00798 348/148 |
| 2011/0060524 A1* | 3/2011 | Miyajima | B60T 7/18 701/300 |
| 2011/0200258 A1* | 8/2011 | Suzuki | G06K 9/00798 382/199 |
| 2012/0215377 A1 | 8/2012 | Takemura et al. | |
| 2012/0263383 A1* | 10/2012 | Otuka | G06K 9/00798 382/195 |
| 2012/0314055 A1* | 12/2012 | Kataoka | G08G 1/167 348/117 |
| 2013/0136306 A1* | 5/2013 | Li | G02B 27/28 382/103 |
| 2015/0169966 A1 | 6/2015 | Ishimaru et al. | |
| 2016/0121889 A1* | 5/2016 | Shimomura | B60W 30/12 701/41 |

FOREIGN PATENT DOCUMENTS

| | | |
|---|---|---|
| JP | 2007-310741 A | 11/2007 |
| JP | A-2008-250453 | 10/2008 |
| JP | 2010-132056 A | 6/2010 |
| JP | A-2011-192164 | 9/2011 |
| JP | A-2011-198276 | 10/2011 |
| JP | 2012-088756 A | 5/2012 |
| JP | A-2013-244787 | 9/2013 |
| JP | A-2013-193467 | 12/2013 |
| JP | A-2014-123287 | 7/2014 |

\* cited by examiner

TRAVEL LANE MARKING RECOGNITION SYSTEM

CROSS-REFERENCE TO RELATED APPLICATION

This application is based on and claims the benefit of priority from Japanese Patent Application No. 2014-220558, filed Oct. 29, 2014. The entire disclosure of the above application is incorporated herein by reference.

BACKGROUND

Technical Field

The present invention relates to a travel lane marking recognition system that recognizes a travel lane marking.

Related Art

Various apparatuses that capture an image of a travel lane with an on-board camera and recognize a travel lane marking from the captured image to provide driving assistance to a vehicle are proposed. A driving assistance apparatus described in JP-A-2005-149023 detects a travel lane marking from image data. When the reliability of the detected travel lane marking is lower than a threshold, the driving assistance apparatus determines that a travel lane marking is not recognized and does not perform driving assistance. In addition, when the reliability of detected left and right travel lane markings is higher than a threshold, the driving assistance apparatus performs a vehicle control process to keep the vehicle traveling within the lane. When the reliability of only one of the left and right travel lane markings is higher than the threshold, the driving assistance apparatus stops the vehicle control process and performs a lane deviation warning process.

The above-described driving assistance apparatus detects a travel lane marking from image data and calculates the reliability of the detected travel lane marking using the image data. Therefore, when imaging conditions for the image become poor, the accuracy of reliability calculation decreases. Driving assistance may be excessively restricted, or erroneous driving assistance may be performed.

SUMMARY

It is thus desired to provide a travel lane marking recognition system that is capable of appropriately using a recognized travel lane marking.

A first exemplary embodiment of the present disclosure provides a travel lane marking recognition system that includes: an on-board camera that captures an image of a travel lane ahead of an own vehicle; and at least one state acquisition apparatus other than the on-board camera that acquires an acquired value indicating a state of the own vehicle. The travel lane marking recognition system includes: a recognizing unit that recognizes a travel lane marking that demarcates the travel lane from an image captured by the on-board camera; a reliability level setting unit that sets reliability level of the travel lane marking recognized by the recognizing unit based on the acquired value acquired by the state acquisition apparatus; and a driving assisting unit that performs driving control of the own vehicle based on the travel lane marking recognized by the recognizing unit when the reliability level set by the reliability level setting unit is higher than a first threshold, and performing a deviation warning of deviation from the travel lane based on the travel lane marking recognized by the recognizing unit when the reliability level is lower than the first threshold.

In the invention according to the first exemplary embodiment, an image of the travel lane ahead of the own vehicle is captured by the on-board camera. The state of the own vehicle, such as the behavior of the own vehicle and information about surroundings of the own vehicle, is detected by at least the single state acquisition apparatus. The travel lane marking is recognized from the captured image. In addition, the reliability level of the recognized travel lane marking is set based on the acquired value acquired by the state acquisition apparatus. Therefore, an acquired value acquired by a state acquisition apparatus other than the on-board camera can be used to set the reliability level of the white line. As a result, an appropriate reliability level can be set.

Furthermore, when the reliability level is higher than the first threshold, driving control of the vehicle is performed based on the recognized travel lane marking. When the reliability level is lower than the first threshold, deviation warning of deviation from the travel lane is performed based on the recognized travel lane marking. In other words, driving control or deviation warning is performed based on the appropriately set reliability level. Therefore, opportunities for appropriate driving assistance can be increased. As a result, the recognized travel lane marking can be appropriately used.

In addition, a second exemplary embodiment of the present disclosure provides a travel lane marking recognition system that includes: an on-board camera that captures an image of a travel lane ahead of an own vehicle; and at least one state acquisition apparatus other than the on-board camera that acquires an acquired value indicating a state of the own vehicle. The travel lane marking recognition system includes: a recognizing unit that recognizes a travel lane marking that demarcates the travel lane from an image captured by the on-board camera; a reliability level setting unit sets a reliability level of the travel lane marking recognized by the recognizing unit based on the acquired value acquired by the state acquisition apparatus; and a display means for displaying the travel lane marking recognized by the recognizing unit such as to differentiate between a portion of which the reliability level set by the reliability level setting means is higher than the first threshold and a portion of which the reliability level is lower than the first threshold.

In the invention according to the second exemplary embodiment, in a manner similar to the invention according to the first exemplary embodiment, an accurate reliability level can be set. Furthermore, the recognized travel lane marking is displayed such that a portion of which the reliability level is higher than the first threshold and a portion of which the reliability level is lower than the first threshold are differentiated. As a result, the driver can grasp the locations where the reliability level is low. The driver can then use more caution at these locations compared to other locations. As a result, the recognized white line can be appropriately used.

DESCRIPTION OF EMBODIMENTS

An embodiment that actualizes a white line recognition system (travel lane marking recognition system) that recognizes a white line (travel lane marking) demarcating a travel lane on a road will be described with reference to the drawings.

Figure 1:
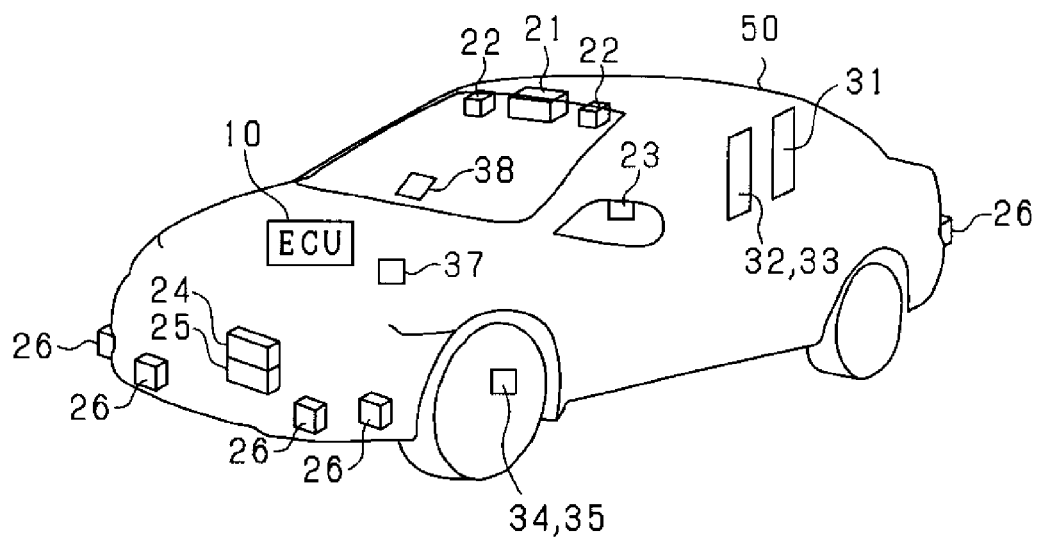
FIG. 1 is a planar view of setting positions of various sensors and apparatuses included in a white line recognition system according to an embodiment.
Figure 2:
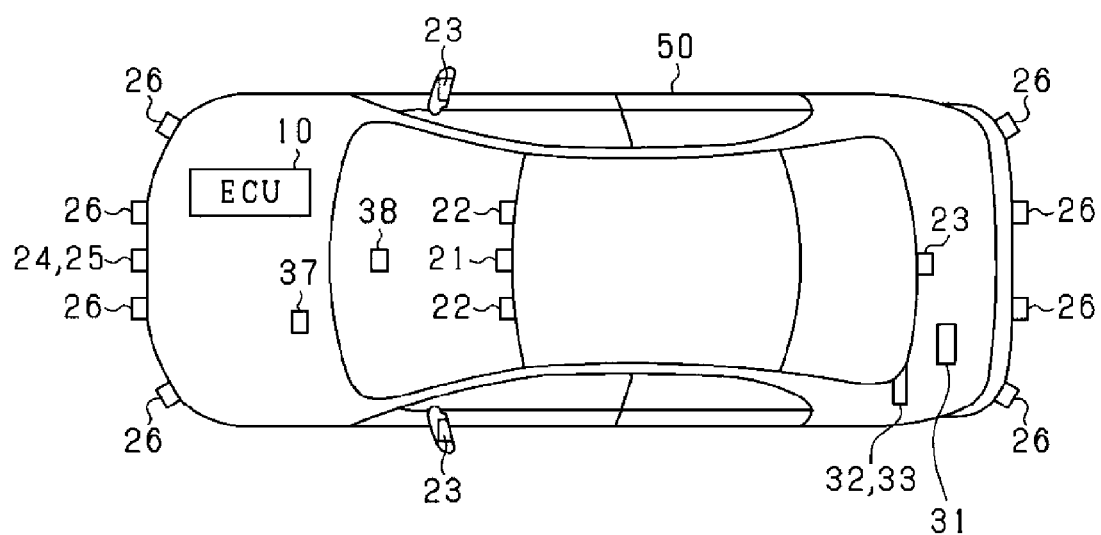
FIG. 2 is a perspective view of the setting positions of various sensors and apparatuses included in the white line recognition system according to the embodiment.
Figure 3:
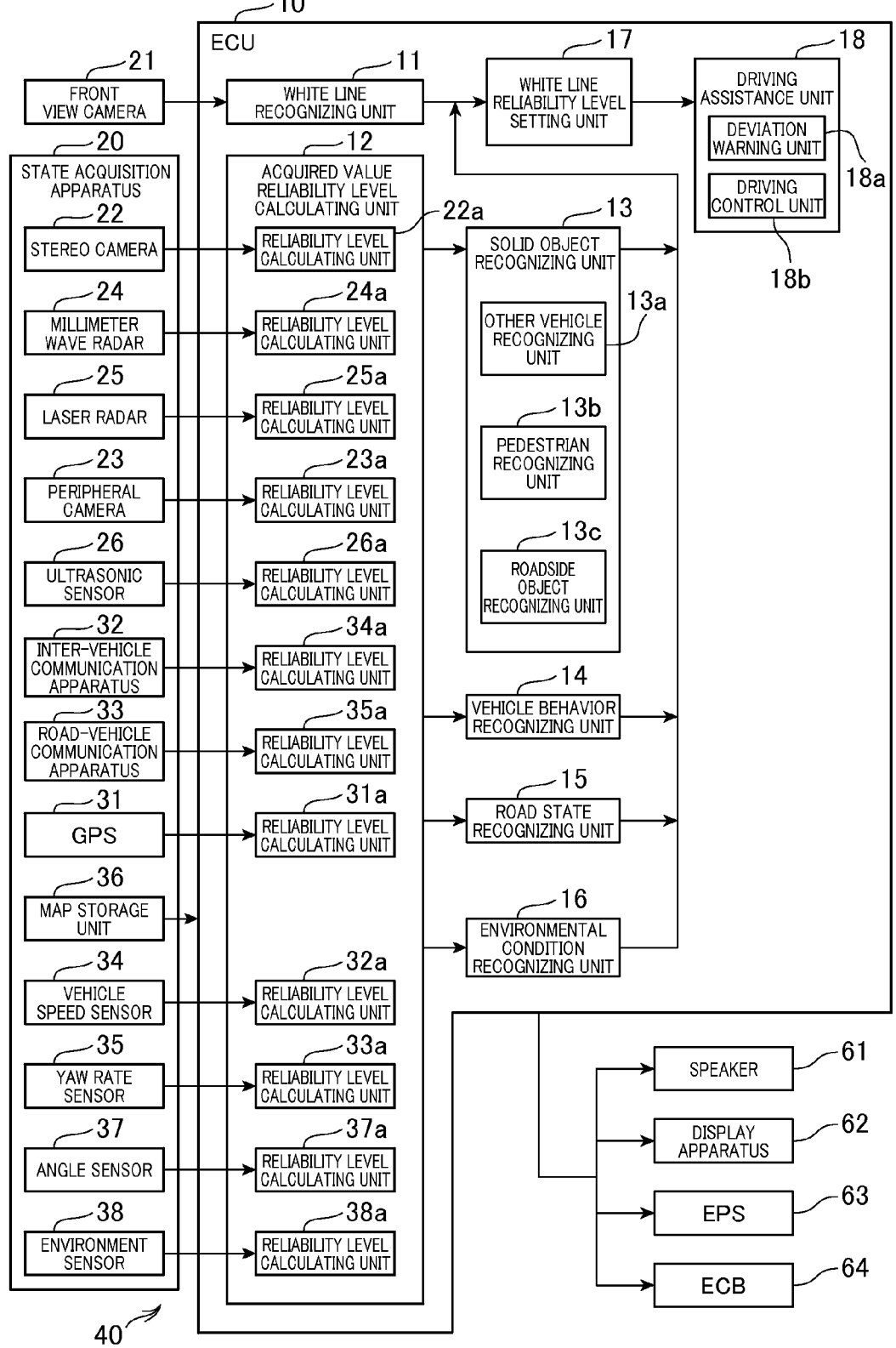
FIG. 3 is a block diagram of a configuration of the white line recognition system according to an embodiment.

First, an overview of a white line recognition system 40 according to the present embodiment will be described with reference to FIG. 1 to FIG. 3. The white line recognition system 40 includes a front view camera 21 (on-board camera), a state acquisition apparatus 20, an electronic control unit (ECU) 10, a speaker 61, a display apparatus 62, electric power steering (EPS) 63, and an electronically controlled brake system (ECB) 64. In the white line recognition system 40, the ECU 10 recognizes a white line from an image captured by the front view camera 21. The ECU 10 then sets a reliability level for the recognized white line based on acquired values acquired by the state acquisition apparatus 20. The ECU 10 sets the recognized white line to a lower reliability level in a state in which the white line is difficult to recognize. Furthermore, when determined that the set reliability level is higher than a predetermined first threshold, the ECU 10 performs driving control of an own vehicle 50 based on the white line. When determined that the set reliability level is lower than the first threshold, the ECU 10 issues a deviation warning of deviation from the lane based on the white line. Details of the white line recognition system 40 will be described below.

The front view camera 21 is a charge-coupled device (CCD) camera, a complementary metal-oxide-semiconductor (CMOS) camera, or the like. The front view camera 21 is attached to the front side of the own vehicle 50, in the center in the width direction, such as in the center of a rearview mirror. The front view camera 21 captures images of the road ahead of the own vehicle 50. A white line on the road is detected and recognized from the image captured by the front view camera 21. Here, when a solid object is present in the periphery of the white line, the solid object may be erroneously recognized as the white line. The solid object may also obstruct recognition of the white line. In addition, the white line is detected based on contrast in the image. Therefore, detection accuracy tends to decrease in a state in which contrast in the image is difficult to extract, such as in backlighting, at night, during rainfall, during fog, or during snowfall.

The state acquisition apparatus 20 is a separate apparatus from the front view camera 21. The state acquisition apparatus 20 acquires acquired values indicating the state of the own vehicle 50. Specifically, the state of the own vehicle 50 includes the state surrounding the own vehicle 50, the behavior of the own vehicle 50, the state of the road on which the own vehicle 50 is traveling, the environmental conditions in which the own vehicle 50 is traveling, and the like. The state surrounding the own vehicle 50 refers to the state of presence/absence of a solid object in the periphery of the own vehicle 50. The solid object is, for example, another vehicle, a pedestrian, or a roadside object that inhibits recognition of the white line. The behavior of the own vehicle 50 includes the speed, yaw rate, pitch angle, roll angle, and the like of the own vehicle 50. The state of the road on which the own vehicle 50 is traveling includes the positions of crosswalks, intersections, sudden curves, guardrails, and the like, the shape of the road, the attributes of the road, and the like. The attributes of the road include expressway, city street, parking lot, and the like. The environmental conditions in which the own vehicle 50 is traveling include the orientation of sunlight, time, rain, fog, snowy road, desert, and the like.

According to the present embodiment, the state acquisition apparatus 20 includes a stereo camera 22, a peripheral camera 23, a millimeter wave radar 24, a laser radar 25, an ultrasonic sensor 26, an inter-vehicle communication apparatus 32, a road-vehicle communication apparatus 33, a global positioning system (GPS) 31, a map storage unit 36, a vehicle speed sensor 34, a yaw rate senor 35, an angle sensor 37, and an environment sensor 38.

The stereo camera 22 is composed a left-and-right pair of cameras (such as CCD cameras or CMOS cameras). For example, the stereo camera 22 is attached to the left and right ends of the rearview mirror, at a predetermined camera baseline length in the vehicle width direction. The stereo camera 22 captures images of the state surrounding the own vehicle 50, including the road ahead of the own vehicle 50. A solid object is extracted by pattern recognition from the stereo image (acquired value) captured by the stereo camera 22. The distance in the depth direction (the advancing direction of the vehicle) and the position in the lateral direction (vehicle width direction) of the solid object is detected based on the principles of triangulation, from the amount of displacement (parallax) between the left and right images of the extracted solid object. Furthermore, relative speed is detected from changes over time in distance. The moving direction is detected from changes over time in position. In addition, through pattern recognition, the solid object is recognized as being any of another vehicle, a pedestrian, or a roadside object (such as a guardrail). The stereo camera 22 provides high resolution regarding the lateral direction and shapes. However, resolution tends to decrease in a state in which contrast in the image is difficult to extract, such as in backlighting, at night, during rainfall, or during snowfall.

The peripheral camera 23 is attached to the each of the rear side, and the left and right sides (such as the left and right side mirrors) of the own vehicle 50. The peripheral cameras 23 capture images of the state surrounding the own vehicle 50. Each peripheral camera 23 captures an image over a substantially 180-degree range around the peripheral camera 23. A solid object in the image (acquired value) captured by the peripheral camera 23 is extracted from the image by pattern recognition. The distance to the solid object and the lateral direction position thereof are detected. In addition, through pattern recognition, the solid object is recognized as being any of another vehicle, a pedestrian, or a roadside object. The peripheral cameras 23 enables the direction to the solid object and the lateral direction position thereof to be easily detected for a solid object that is present at a relatively close distance to the own vehicle 50. However, detection of the distance to a faraway solid object and the lateral direction position thereof tends to be difficult. In addition, in a manner similar to the stereo camera 22, accuracy tends to decrease in the peripheral camera 23 in a state in which contrast in the image is difficult to extract.

The millimeter wave radar 24 and the laser radar 25 are attached to the front end portion (such as above the bumper) of the own vehicle 50, in the center in the vehicle width direction. The millimeter wave radar 24 and the laser radar 25 detect the distance to and the direction of a solid object that is present ahead of or to the side of the own vehicle 50. Specifically, the millimeter wave radar 24 emits a plurality of millimeter wave beams in a radiating manner. The millimeter wave radar 24 then receives reflected waves (acquired value) from a solid object. The distance from the own vehicle 50 to the solid object and the lateral distance direction of the solid object are detected based on the reception direction and the amount of time from when the millimeter wave beams are transmitted by the millimeter wave radar 24 to when the reflected waves are received by the millimeter wave radar 24. Furthermore, the relative speed is detected from changes over time in distance. The moving direction is detected from changes over time in position. In addition, the solid object is recognized as being any of another vehicle, a pedestrian, or a roadside object, from the distance, position, and relative speed. Compared to the stereo camera 22 and the laser radar 25, the millimeter wave radar 24 has a lower resolution regarding the lateral direction position. However, the millimeter wave radar 24 tends to be less affected by rainfall, snowfall, and the like.

Meanwhile, the laser radar 25 emits pulses of narrow-width laser light in the lateral direction, or the lateral direction and the vertical direction, while scanning over a predetermined angular field of view. The laser radar 25 then receives reflected light (acquired value) from a solid object. The distance from the own vehicle 50 to the solid object and the lateral direction position of the solid object are detected from the light-reception direction and the amount of time from when the laser light is emitted by the lase radar 25 to when the reflected light is received by the laser radar 25. Furthermore, the relative speed is detected from changes over time in distance. The moving direction is detected from changes over time in position. In addition, the solid object is recognized as being any of another vehicle, a pedestrian, or a roadside object, from the distance, position, and relative speed. The laser radar 25 provides high resolution regarding the lateral direction position. However, the laser radar 25 is more easily affected by rainfall, snowfall, and the like, than the millimeter wave radar 24.

Four ultrasonic sensors 26 each are attached to the front end portion and the rear end portion of the own vehicle 50. The ultrasonic sensor 26 is less expensive than the millimeter wave radar 24 and the laser radar 25. Therefore, a plurality of ultrasonic sensors 26 are attached around the own vehicle 50. The ultrasonic sensor 26 emits ultrasonic waves that have directivity, and receives reflected waves from a solid object. The distance from the own vehicle 50 to the solid object and the lateral distance position of the solid object are detected based on the principles of triangulation, from the reflected waves (acquired values) received by the plurality of ultrasonic sensors 26. In addition, the solid object is recognized as being any of another vehicle, a pedestrian, or a roadside object, from the distance, position, and relative speed. Furthermore, the relative speed is detected from changes over time in distance. The moving direction is detected from changes over time in position.

The inter-vehicle communication apparatus 32 receives information (acquired value) on the position and speed of another vehicle that is provided with an inter-vehicle communication apparatus. The inter-vehicle communication apparatus 32 also transmits information on the position and speed of the own vehicle 50 to another vehicle that is provided with an inter-vehicle communication apparatus. The road-vehicle communication apparatus 33 receives, from a roadside apparatus, the position of a specific location on the road, such as a crosswalk, an intersection, or a guardrail, in relation to the own vehicle 50. The road-vehicle communication apparatus 33 also receives, from the roadside apparatus, the shape and attributes of the road, information on the position of a solid object, such as another vehicle or a pedestrian, in relation to the own vehicle 50, and the current position (acquired value) of the own vehicle 50. The roadside apparatus acquires position information on other vehicles and pedestrians using a sensor that is mounted in the roadside apparatus, and receives position information transmitted from communication apparatuses provided in other vehicles and on pedestrians.

The GPS 31 acquires information (acquired values) on the current position of the own vehicle 50 and the current time, based on signals transmitted from a GPS satellite. The information on the current position includes latitude, longitude, and altitude. The map storage unit 36 is a storage unit, such as a hard disk or a digital versatile disk (DVD), in which map information is stored. The map information includes the positions of specific locations on the road, such as crosswalks, intersections, and guardrails, and the shape and attributes of the road. The state surrounding the own vehicle 50 (acquired values) is acquired from the current position of the own vehicle 50 acquired by the GPS 31, and the map information on the surrounding area of the own vehicle 50 acquired from the map storage unit 36.

The vehicle speed sensor 34 is attached to a wheel of the own vehicle 50 and detects the speed of the own vehicle 50. The yaw rate sensor 35 is attached to a wheel of the own vehicle 50 and detects the yaw rate of the own vehicle 50. The angle sensor 37 includes a gyro sensor and an acceleration sensor attached to the vehicle body of the own vehicle 50. The angle sensor 37 acquires the pitch angle and the roll angle (acquired values) of the own vehicle 50 from the angular speed detected by the gyro sensor and the acceleration detected by the acceleration sensor. Alternatively, the angle sensor 37 may be height sensors attached to the front and rear end portions and the left and right end portions of the own vehicle 50. The angle sensor 37 acquires the pitch angle from the difference in height between the front end portion and the rear end portion of the own vehicle 50, and acquires the roll angle from the difference in height between the left end portion and the right end portion.

The environment sensor 38 is, for example, a rain sensor, a temperature sensor, or a sunlight sensor that detects the environmental conditions during vehicle travel. The rain sensor detects the amount of rainfall (acquired value). The temperature sensor detects the outside temperature (acquired value). The sunlight sensor detects the amount of sunlight (acquired value).

The speaker 61 is attached inside of the vehicle cabin, and outputs sound, speech, and the like. The display apparatus 62 (display means) displays messages, images, and the like. The electric power steering 63 uses torque generated by an electric motor and assists in operating the steering wheel. The electronically controlled brake system 64 electrically adjusts hydraulic pressure for actuation of a friction brake provided for each wheel.

The ECU 10 is configured as a microcomputer that includes a central processing unit (CPU), a read-only memory (ROM), a random access memory (RAM), an input/output (I/O), and the like. The ECU 10 processes the acquired values acquired by the state acquisition apparatus 20. In the ECU 10, the CPU runs various programs stored in the ROM. The ECU 10 thereby actualizes the functions of a white line recognizing unit 11, an acquired value reliability level calculating unit 12, a solid object recognizing unit 13, a vehicle behavior recognizing unit 14, a road state recognizing unit 15, an environmental condition recognizing unit 16, a white line reliability level setting unit 17, and a driving assistance unit 18.

Figure 4:
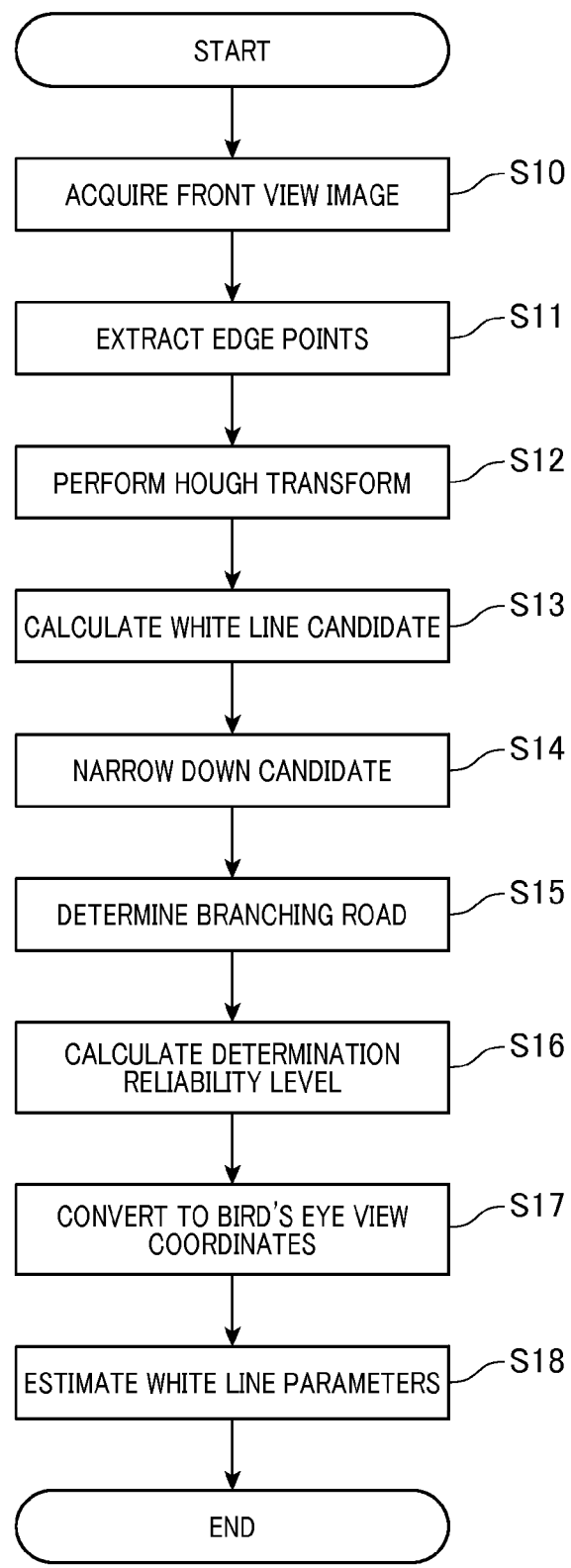
FIG. 4 is a flowchart of a process for recognizing a white line according to the embodiment.

The white line recognizing unit (recognizing means) 11 recognizes a white line from an image captured by the front view camera 21. The process for white line recognition performed by the white line recognizing unit 11 will be described with reference to the flowchart in FIG. 4.

First, the white line recognizing unit 11 acquires a front view image captured by the front view camera 21. The white line recognizing unit 11 then applies a filter, such as a Sobel filter, to the front view image acquired at step S10, and extracts edge points (step S11). Next, the white line recognizing unit 11 performs a Hough transform on the edge points extracted at step S11 (step S12). The white line recognizing unit 11 then calculates and detects a white line candidate (travel lane marking candidate) (step S13).

Next, when a plurality of white line candidates are detected at S13 as candidates for the white line demarcating one side of the travel lane, the white line recognizing unit 11 narrows down the plurality of white line candidates to the white line candidate most likely to be the white line (step S14). Specifically, the white line recognizing unit 11 calculates the degree of inclusion of white line features for each white line candidate, and narrows down the white line candidates to the white line candidate having the highest degree of inclusion of white line features.

Next, the white line recognizing unit 11 determines whether or not the narrowed-down white line candidate is a white line on a branching road, based on a recognition distance of the narrowed-down white line candidate, the curvature of the white line candidate, and the like (step S15). The recognition distance is the distance to the farthest edge point included in the white line candidate. Next, the white line recognizing unit 11 calculates the reliability level of the branching road determination performed at step S15 (step S16). Specifically, a white line candidate on a gradient road may be determined to be a white line on a branching road, when determination is made based on a monocular image alone. Therefore, the white line recognizing unit 11 calculates the reliability level of the branching road determination based on the acquired values from the state acquisition apparatus 20.

For example, when the gradient of the road detected by the stereo camera 22 is greater than a predetermined gradient, the white line recognizing unit 11 reduces the reliability level of the branching road determination. Alternatively, when the gradient of the road at the current position of the own vehicle 50 or the gradient of the road received from the road-vehicle communication apparatus 33 is greater than a predetermined gradient, the white line recognizing unit 11 reduces the reliability level of the branching road determination. The gradient of the road at the current position of the own vehicle 50 is included in the map information in the map storage unit 36. In addition, when the position of the own vehicle 50 is before a branching road on the map or when information is received from the road-vehicle communication apparatus 33 that the travel lane will branch off ahead of the own vehicle 50, the white line recognizing unit 11 raises the reliability level of the branching road determination. The white line recognition unit 11 may calculate each reliability level based on the acquired values of each sensor and apparatus. The white line recognition unit 11 may then calculate the reliability level of the branching road determination by combining the calculated reliability levels. According to the present embodiment, the stereo camera 22, the GPS 31, the map storage unit 36, and the road-vehicle communication apparatus 33 correspond to a gradient detection apparatus. The process at step S15 corresponds to a branching road determining unit. The process at step S16 corresponds to a branching reliability level calculator unit.

Next, the white line recognizing unit 11 converts the coordinates of the white line candidate to which the white line candidates have been narrowed down at step S14 to bird's eye view coordinates (step S17). Next, the white line recognizing unit 11 estimates white line parameters based on the white line candidate that has been converted to the bird's eye view coordinates at step S17 (step S18). Here, when determined that the white line candidate is a white line on a branching road at step S15 and the reliability level of the branching determination calculated at step S16 is higher than a determination threshold, the white line recognizing unit 11 considers the likelihood of the white line candidate being a white line on a branching road to be high. The white line recognizing unit 11 does not use the white line candidate to estimate the white line parameters. In other words, the white line recognizing unit 11 does not recognize the white line candidate as a white line. In this case, when the white line candidate on the other side is detected, the white line recognizing unit 11 estimates the white line parameters based on the white line candidate on the other side. That is, the white line recognizing unit 11 recognizes only the white line candidate on the other side as the white line.

The white line parameters indicate the characteristics of the lane and includes the curvature of the lane, curvature change rate, lane position, lane width, and the like. When the white lines on both sides are recognized, the intersection point, that is, the vanishing point of the white lines on both sides is calculated. The pitch angle of the own vehicle 50 is calculated from the calculated vanishing point. The curvature and the like are then calculated using the calculated pitch angle. When the white line on one side is recognized, the pitch angle of the own vehicle 50 detected by the angle sensor 50 is set as the calculated pitch angle. Alternatively, when the white line on one side is recognized, the pitch angle is calculated by another image processing algorithm, such as optical flow. The process at step S18 corresponds to a pitch angle calculator unit and a curvature calculator unit.

Returning to FIG. 3, the acquired value reliability level calculating unit (acquired value reliability level calculating unit) 12 calculates the reliability levels of the acquired values of the various sensors 22 to 26, 34, 35, 37, and 38 included in the state acquisition apparatus 20. The acquired value reliability level calculating unit 12 also calculates the reliability levels of the acquired values of the various apparatuses 31 to 33. Specifically, the acquired value reliability level calculating unit 12 sets the acquired value to a higher reliability level, as the period over which the acquired value is continuously acquired increases or the frequency of the acquired value increases. An instantaneous acquired value is very likely to be noise. Therefore, the reliability level thereof is calculated to be relatively low. In addition, the acquired value reliability level calculating unit 12 may change the reliability level of an acquired value of a second sensor based on the acquired value of a first sensor. For example, when a rainfall amount that is greater than a predetermined rainfall amount is acquired by the environment sensor 38, the reliability levels of the acquired values of the stereo camera 22 and the peripheral cameras 23 are reduced.

The solid object recognizing unit 13 includes an other vehicle recognizing unit 13a, a pedestrian recognizing unit 13b, and a roadside object recognizing unit 13c. The solid object recognizing unit 13 recognizes a solid object in the periphery of the own vehicle 50. Specifically, the other vehicle recognizing unit 13a recognizes the distance in the depth direction to another vehicle in the periphery of the own vehicle 50, the lateral direction position of the other vehicle, the relative speed of the other vehicle, and the moving direction of the other vehicle, from the acquired values acquired by the various sensors 22 to 26, the inter-vehicle communication apparatus 32 and the road-vehicle communication apparatus 33. In a similar manner, the pedestrian recognizing unit 13b recognizes the distance in the depth direction to a pedestrian in the periphery of the own vehicle 50, the lateral direction position of the pedestrian, the relative speed of the pedestrian, and the moving direction of the pedestrian, from the acquired values acquired by the various sensors 22 to 26 and the road-vehicle communication apparatus 33. In addition, the roadside object recognizing unit 13c recognizes the distance in the depth direction to a roadside object and the lateral direction position of the roadside object from the acquired values acquired by the various sensors 22 to 26, the GPS 31, the map storage unit 36, and the road-vehicle communication apparatus 33.

According to the present embodiment, a solid object detection apparatus corresponds to the stereo camera 11, the peripheral cameras 23, the millimeter wave radar 24, the laser radar 25, the ultrasonic sensors 26, the GPS 31, the map storage unit 36, the inter-vehicle communication apparatus 32, or the road-vehicle communication apparatus 33. In addition, according to the present embodiment, an other vehicle detection apparatus corresponds to the stereo camera 22, the peripheral cameras 23, the millimeter wave radar 24, the laser radar 25, the ultrasonic sensors 26, the inter-vehicle communication apparatus 32, or the road-vehicle communication apparatus 33.

The vehicle behavior recognizing unit 14 recognizes the pitching state and the rolling state of the own vehicle 50 from the pitch angle and the roll angle detected by the angle sensor 37. According to the present embodiment, a vehicle behavior sensor corresponds to the angle sensor 37.

The road state recognizing unit 15 recognizes the state of the road on which the own vehicle 50 is traveling. For example, the road state recognizing unit 15 recognizes the positions of crosswalks, intersections, tunnels, sudden curves, guardrails, and the like in relation to the own vehicle 50, the shape of the road (gradient and curvature), and the attributes of the road, from the map information of the periphery of the current position of the own vehicle 50, the information received from the road-vehicle communication apparatus 33, and captured images from the stereo camera 22 or the peripheral cameras 23. According to the present embodiment, a position acquisition apparatus that acquires the current position of the own vehicle 50 on a map corresponds to the GPS 31 and the road-vehicle communication apparatus 33. In addition, according to the present embodiment, an attribute acquisition apparatus corresponds to the stereo camera 22, the peripheral cameras 23, the GPS 21, the map information storage unit 36, and the road-vehicle communication apparatus 33.

The environment condition recognizing unit 16 recognizes the environmental conditions during travel. Specifically, for example, the environmental condition recognizing unit 16 recognizes the orientation of sunlight from the current position and the current time acquired from the GPS 31. In addition, the environmental condition recognizing unit 16 recognizes day or night from the current time acquired from the GPS 31. Furthermore, the environmental condition recognizing unit 16 recognizes whether or not there is rainfall or fogging from the rainfall amount detected by the environment sensor 38. Still further, the environmental condition recognizing unit 16 recognizes a snowy road or a desert from images captured by the stereo camera 22 and the peripheral cameras 23, and from outside temperature detected by the environment sensor 38.

The solid object recognizing unit 13, the vehicle behavior recognizing unit 14, the road state recognizing unit 15, and the environmental condition recognizing unit 16 each use only the acquired values of which the reliability level calculated by the acquired value reliability level calculating unit 12 is higher than a second threshold.

The white line reliability level setting unit (reliability level setting unit) 17 sets the reliability level of the white line recognized by the white line recognizing unit 11 based on the acquired values acquired by the state acquisition apparatus 20. Specifically, for example, an initial value is set as the reliability level. When a solid object is detected in a position corresponding to the periphery of the recognized white line, the white line reliability level setting unit 17 reduces the reliability level of the white line in the periphery of the solid object. In other words, the white line is difficult to recognize in the location where the solid object is present. Therefore, the white line reliability level setting unit 17 reduces the reliability level of the white line in the periphery of the solid object. In addition, when the difference between the direction in which the recognized white line extends and the moving direction of another vehicle in the periphery is greater than a predetermined angle (the directions differ), there is risk that the white line is being erroneously recognized. Therefore, when the direction in which the recognized white line extends and the moving direction of the other vehicle detected in the periphery of the own vehicle 50 differ, the white line reliability level setting unit 17 reduces the reliability level of the white line.

Furthermore, when a crosswalk is present ahead of the own vehicle 50, the display of the crosswalk drawn on the road may be erroneously recognized as the white line. Therefore, when the current position of the own vehicle 50 is before a crosswalk on the map, the white line reliability level setting unit 17 reduces the reliability level of the white line in the periphery of the crosswalk. In a similar manner, in a parking lot in which various lines and characters are drawn on the road surface, the white line may be erroneously recognized. Therefore, when the attributes of the road on which the own vehicle 50 is traveling indicate a parking lot, the white line reliability level setting unit 17 reduces the reliability level of the white line. In addition, numerous obstacles are present on a city street and are easily erroneously recognized as the white line. Therefore, when the attributes of the road on which the own vehicle 50 is traveling indicate a city street, the white line reliability level setting unit 17 reduces the reliability level of the white line. The white line reliability level setting unit 17 may also reduce the reliability level of the white line in the periphery of certain locations on the road where white lines may be difficult to recognize, in addition to the crosswalk, such as intersections, tunnels, and sudden curves.

Moreover, when the own vehicle 50 is pitching and rolling, it is difficult to determine whether the image is uneven as a result of the pitching and rolling or whether the lane is tilted. The white line is easily erroneously recognized. Therefore, when at least either the pitch angle of the own vehicle 50 is greater than a first angle or the roll angle of the own vehicle 50 is greater than a second angle, the white line reliability level setting unit 17 reduces the reliability level of the white line. In addition, when the white lines on both sides of the own vehicle 50 are recognized, when the difference between the pitch angle of the own vehicle 50 calculated from both white lines and the detected pitch angle of the own vehicle 50 is large, there is risk that the white line is being erroneously recognized. Therefore, when the difference is greater than a third angle, the white line reliability level setting unit 17 reduces the reliability level of the white line.

In addition, when a roadside object is present in a location of a sudden curve or a location where the amount of change in curvature of the lane is large, the roadside object is easily erroneously recognized as the white line. Therefore, when at least either the curvature calculated from the recognized white line is greater than a first predetermined value or the calculated curvature change rate is greater than a second predetermined value, and a solid object is detected in the position corresponding to the periphery of the white line, the white line reliability level setting unit 17 reduces the reliability level of the white line. According to the present embodiment, a roadside object detection apparatus corresponds to the various sensors 22 to 26, the GPS 31, the map storage unit 36, and the road-vehicle communication apparatus 33.

Furthermore, when the environmental conditions surrounding the own vehicle 50 acquired by an environmental condition acquisition apparatus indicates environmental conditions in which the white line is difficult to recognize, the white line reliability level setting unit 17 reduces the reliability level of the white line. Environmental conditions in which the white line is difficult to recognize include, for example, backlighting in relation to the front view camera 21, rainfall, fogging, night, snowy road, and desert. According to the present embodiment, the environmental condition acquisition apparatus corresponds to the stereo camera 22, the peripheral cameras 23, the GPS 31, the map storage unit 36, and the environmental sensor 38.

The white line reliability level setting unit 17 may calculate the reliability level of the white line based on each acquired value. The white line reliability level setting unit 17 may then combine the calculated reliability levels, and thereby set the reliability level of the recognized white line. Alternatively, the white line reliability level setting unit 17 may set the reliability level of the recognized white line to be lower, as the conditions become closer to conditions in which the white line is difficult to recognize.

However, when the reliability levels of a plurality of acquired values are higher than the second threshold, and the states of the own vehicle 50 respectively indicated by the plurality of acquired values do not match with one another, it cannot be determined which acquired value is reliable. Therefore, in such cases, the white line reliability level setting unit 17 reduces the reliability level of the recognized white line to a value determined in advance (a value lower than the first threshold).

In addition, under a condition that acquired values indicating a state in which the white line is difficult to recognize are acquired over a predetermined amount of time so as to amount to more than predetermined percentage by the components in the state acquiring apparatus 20, the reliability level setting unit 17 may reduce the reliability level of the white line. As a result, risk of the reliability level of the white line being erroneously reduced when the state acquisition apparatus 20 instantaneously acquires noise can be suppressed.

Furthermore, the white line reliability level setting unit 17 uses information from the images captured by the front view camera 21 to correct the reliability level of the white line set based on the acquired values, and resets the reliability level. Specifically, when a plurality of white line candidates are detected on one side of the own vehicle 50, the white line is more easily erroneously recognized than when a single white line candidate is detected. Therefore, when a plurality of white line candidates are detected on one side of the own vehicle 50, the white line reliability level setting unit 17 reduces the reliability level of the white line that has been set based on the acquired value. In addition, when the recognized white line is a composite line, the risk of erroneous recognition is higher than that of a single line. Therefore, when the recognized white line is a composite line, the white line reliability level setting unit 17 reduces the reliability level of the white line that has been set based on the acquired values. Furthermore, when numerous edge points not included in the white line are extracted in the periphery of the recognized white line, there is risk that the white line is being erroneously recognized. Therefore, when edge points exceeding a predetermined quantity are extracted in the periphery of the recognized white line, the white line reliability level setting unit 17 reduces the reliability level of the white line that has been set based on the acquired values.

In addition, at locations where the curvature or the curvature change rate of the white line is large, the white line is easily erroneously recognized. Therefore, when at least either the curvature calculated from the recognized white line is greater than a third predetermined value or the calculated curvature change rate is greater than a fourth predetermined value, the white line reliability level setting unit 17 reduces the reliability level of the white line that has been set based on the acquired values.

Furthermore, the white line reliability level setting unit 17 may reduce the reliability level of the white line that has been set based on the acquired values in other cases as well. These cases include, for example, when the recognition distance of the recognized white line is shorter than a predetermined distance, when the percentage of a broken line portion in relation to a solid line portion of the recognized white line is less than a predetermined percentage, when the contrast of the recognized white line is lower than a predetermined value, or when the color of the road surface is light (such as in the case of a concrete road surface).

The driving assistance unit (driving assisting means) 18 includes a deviation warning unit 18a and a driving control unit 18b. The driving assistance unit 18 provides driving assistance to the own vehicle 50. Specifically, when the reliability level set by the white line reliability level setting unit 17 is lower than the first threshold, the deviation warning unit 18a performs driving assistance. When the set reliability level is higher than the first threshold, the driving control unit 18b performs driving assistance.

The deviation warning unit 18a performs output of a warning sound or a warning message from the speaker 61 or output of a warning message from the display apparatus 62, when the distance in the lateral direction between the recognized white line and the own vehicle 50 becomes a predetermined distance or shorter, or when the own vehicle 50 crosses the recognized white line. The driving control unit 18b operates the electric power steering 63 and the electronically controlled brake system 64 such that the own vehicle 50 travels within the lane demarcated by the recognized white line. The driving control unit 18b calculates the control amounts for the electric power steering 63 and the electronically controlled brake system 64, based on the detected vehicle speed and yaw rate.

When the reliability level set by the white line reliability level setting unit 17 is lower than a third threshold, driving assistance may not be performed. The third threshold is a value lower than the first threshold.

According to the above-described embodiment, the following effects are achieved.

The reliability level of a recognized white line is set based on the acquired values respectively acquired by the components of the state acquisition apparatus 20. Therefore, the acquired values acquired by the state acquisition apparatus 20, in addition to the front view camera 21, are used to set the reliability level of the white line. Thus, an appropriate reliability level can be set. When the reliability level is higher than the first threshold, driving control of the own vehicle 50 is performed based on the recognized white line. When the reliability level is lower than the first threshold, deviation warning of deviation from the travel lane is issued based on the recognized white line. In other words, driving control or deviation warning is performed based on the reliability level that has been appropriately set. Therefore, appropriate opportunities for driving assistance can be increased. As a result, the recognized white line can be appropriately used.

When a solid object is present in the periphery of a recognized white line, the reliability level of the white line in the periphery of the solid object is reduced. That is, in a state in which the travel lane marking is difficult to recognize, the reliability level of the recognized white line is reduced. As a result, an appropriate reliability level can be set for the white line. Erroneous use of the recognized white line can be suppressed.

When a crosswalk is present ahead of the own vehicle 50 on a map, the reliability level of the white line in the periphery of the crosswalk is reduced. As a result, an appropriate reliability level can be set for the white line. Erroneous use of the recognized white line can be suppressed.

Numerous obstacles are present on a city street. Therefore, the white line may be erroneously recognized. When the own vehicle is traveling on a city street, the reliability level of the white line is reduced. As a result, an appropriate reliability level can be set for the white line. Erroneous use of the recognized white line can be suppressed.

Various lines, characters, and the like are drawn on the road surface in a parking lot. Therefore, the white line may be erroneously recognized. When the own vehicle is traveling in a parking lot, the reliability level of the white line is reduced. As a result, an appropriate reliability level can be set for the white line. Erroneous use of the recognized white line can be suppressed.

When the difference between the direction in which a recognized white line extends and the moving direction of a detected other vehicle is greater than a predetermined angle, the reliability level of the white line is reduced. As a result, an appropriate reliability level can be set for the white line. Erroneous use of the recognized white line can be suppressed.

When at least either the pitch angle of the own vehicle 50 is greater than the first angle or the roll angle of the own vehicle 50 is greater than the second angle, the reliability level of the white line is reduced. As a result, an appropriate reliability level can be set for the white line. Erroneous use of the recognized white line can be suppressed.

In backlighting, at night, during rainfall, during fog, on a snowy road, or in a desert, the white line is difficult to recognize from the image captured by the front view camera 21. The white line may be erroneously recognized. Therefore, when the environmental conditions surrounding the own vehicle 50 indicate backlighting in relation to the front view camera 21, night, rainfall, fogging, a snowy road, or a desert, the reliability level of the white line is reduced. As a result, an appropriate reliability level can be set for the white line. Erroneous use of the recognized white line can be suppressed.

When the difference between the pitch angle calculated from the white lines on both sides of the own vehicle 50 and the pitch angle detected by the angle sensor 37 is greater than the third angle, the reliability level of the white line is reduced. As a result, an appropriate reliability level can be set for the white line. Erroneous use of the recognized white line can be suppressed.

When only the white line on one side of the own vehicle 50 is recognized, the pitch angle detected by the angle sensor 37 is set as the calculated pitch angle. As a result, estimation accuracy of curvature and the like can be improved.

When the recognized white line is determined to be on a branching road and the gradient of the detected lane is greater than a predetermined gradient, the reliability level of the branching road determination is reduced. As a result, erroneous use of the recognized white line can be suppressed.

When at least either the curvature calculated from the recognized white line is greater than the first predetermined value or the calculated curvature change rate is greater than the second predetermined value, and a solid object is positioned in the periphery of the recognized white line, the reliability level of the white line is reduced. As a result, an appropriate reliability level can be set for the white line. Erroneous use of the recognized white line can be suppressed.

When, regardless of the reliability levels of the acquired values acquired by the plurality of components of the state acquisition apparatus 20 being higher than the second threshold, the states of the own vehicle 50 respectively indicated by the plurality of acquired values do not match with one another, it cannot be determined which acquired value is reliable. Therefore, during an abnormality such as this, the reliability level of the recognized white line is reduced. As a result, control can be performed such as to err on the side of caution during an abnormality.

The reliability level of the white line that has been set based on the acquired values can be corrected through use of information from images as well. As a result, a more appropriate reliability level can be set for the white line.

When a plurality of white line candidates are detected from an image captured by the front view camera 21, the reliability level of the white lie is reduced. As a result, an appropriate reliability level can be set for the white line. Erroneous use of the recognized white line can be suppressed.

When the recognized white line is a composite line, the reliability level of the white lie is reduced. As a result, an appropriate reliability level can be set for the white line. Erroneous use of the recognized white line can be suppressed.

When at least either the curvature calculated from the recognized white line is greater than the third predetermined value or the calculated curvature change rate is greater than the fourth predetermined value, the reliability level of the white lie is reduced. As a result, an appropriate reliability level can be set for the white line. Erroneous use of the recognized white line can be suppressed.

When edge points exceeding a predetermined quantity are extracted in the periphery of the recognized white line, the reliability level of the white lie is reduced. As a result, an appropriate reliability level can be set for the white line. Erroneous use of the recognized white line can be suppressed.

The positions of locations where the white line is easily erroneously recognized, such as crosswalks, and positions in which the road is shaped such that the white line is easily erroneously recognized can be accurately acquired through use of the map information on the periphery of the own vehicle 50.

Other Embodiments

The recognized white line may be displayed in the display apparatus 62. In this case, the recognized white line may be displayed in the display apparatus 62 such that a portion of which the set reliability level is higher than the first threshold and a portion of which the set reliability level is lower than the first threshold are differentiated. As a result, the driver can grasp the locations where the reliability level of the recognized white line is low. The driver can then use more caution in these locations compared to other locations. As a result, the recognized white line can be appropriately used.

The state acquisition apparatus 20 is merely required to include at least a single sensor or apparatus that is other than the single front view camera 21. The components included in the state acquisition apparatus 20 are not limited to those according to the above-described embodiment.

The reliability level of the white line may be reduced under a condition that the acquired values indicating a state in which the white line is difficult to recognize are acquired over a predetermined amount of time such as to amount to more than predetermined percentage by the components in the state acquiring apparatus 20. As a result, risk of the reliability level of the white line being erroneously reduced when the state acquisition apparatus 20 instantaneously acquires noise can be suppressed.

What is claimed is:

1. A travel lane marking recognition system comprising:
    an on-board camera that captures an image of a travel lane ahead of an own vehicle;
    at least one state acquisition apparatus other than the on-board camera that acquires an acquired value indicating a state of the own vehicle;
    a recognizing unit that recognizes a travel lane marking that demarcates the travel lane from an image captured by the on-board camera;
    a reliability level setting unit that sets a reliability level of the travel lane marking recognized by the recognizing unit based on the acquired value acquired by the state acquisition apparatus; and
    a driving assisting unit that performs driving control of the own vehicle based on the travel lane marking recognized by the recognizing unit when the reliability level set by the reliability level setting unit is higher than a first predetermined threshold, and performs a deviation warning of deviation from the travel lane based on the travel lane marking recognized by the recognizing unit when the reliability level is lower than the first predetermined threshold, wherein
    the at least one state acquisition apparatus includes a solid object detection apparatus that detects a solid object in a periphery of the own vehicle, and
    the reliability level setting unit reduces the reliability level of the travel lane marking in a periphery of the solid object when the solid object is detected, by the solid object detection apparatus, in a position corresponding to a periphery of the travel lane marking recognized by the recognizing unit.

2. The travel lane marking recognition system according to claim 1, wherein
    the at least one state acquisition apparatus includes a position acquisition apparatus that acquires a current position of the own vehicle on a map, and
    the reliability level setting unit reduces the reliability level of the travel lane marking in a periphery of a crosswalk when the current position of the own vehicle acquired by the position acquisition apparatus is before the crosswalk on the map.

3. The travel lane marking recognition system according to claim 1, wherein
    the at least one state acquisition apparatus includes an attribute acquisition apparatus that acquires an attribute of a road on which the own vehicle is traveling, and
    the reliability level setting unit reduces the reliability level of the travel lane marking when the attribute acquired by the attribute acquisition apparatus indicates a city street.

4. The travel lane marking recognition system according to claim 1, wherein
    the at least one state acquisition apparatus includes an attribute acquisition apparatus that acquires an attribute of a road on which the own vehicle is traveling, and
    the reliability level setting unit reduces the reliability level of the travel lane marking when the attribute acquired by the attribute acquisition apparatus indicates a parking lot.

5. The travel lane marking recognition system according to claim 1, wherein
    the at least one state acquisition apparatus includes an other vehicle detection apparatus that detects an other vehicle in a periphery of the own vehicle, and
    the reliability level setting unit reduces the reliability level of the travel lane marking when a difference between a direction in which the travel lane marking recognized by the recognizing unit extends and a moving direction of the other vehicle detected by the other vehicle detection apparatus is greater than a predetermined angle.

6. The travel lane marking recognition system according to claim 1, wherein
    the at least one state acquisition apparatus includes a vehicle behavior sensor that detects at least one of a pitch angle of the own vehicle and a roll angle of the own vehicle, and
    the reliability level setting unit reduces the reliability level of the travel lane marking when at least one of when the pitch angle detected by the vehicle behavior sensor is greater than a first predetermined angle and when the roll angle detected by the vehicle behavior sensor is greater than a second predetermined angle.

7. The travel lane marking recognition system according to claim 1, wherein
    the at least one state acquisition apparatus includes an environmental condition acquisition apparatus that acquires an environmental condition in a periphery of the own vehicle, and
    the reliability level setting unit reduces the reliability level of the travel lane marking when the environmental condition acquired by the environmental condition acquisition apparatus indicates being in backlighting in relation to the on-board camera.

8. The travel lane marking recognition system according to claim 1, wherein
the at least one state acquisition apparatus includes an environmental condition acquisition apparatus that acquires an environmental condition in a periphery of the own vehicle, and
the reliability level setting unit reduces the reliability level of the travel lane marking when the environmental condition acquired by the environmental condition acquisition apparatus indicates being at night.

9. The travel lane marking recognition system according to claim 1, wherein
the at least one state acquisition apparatus includes an environmental condition acquisition apparatus that acquires an environmental condition in a periphery of the own vehicle, and
the reliability level setting unit reduces the reliability level of the travel lane marking when the environmental condition acquired by the environmental condition acquisition apparatus indicates being during rainfall or during fog.

10. The travel lane marking recognition system according to claim 1, wherein
the at least one state acquisition apparatus includes an environmental condition acquisition apparatus that acquires an environmental condition in a periphery of the own vehicle, and
the reliability level setting unit reduces the reliability level of the travel lane marking when the environmental condition acquired by the environmental condition acquisition apparatus indicates being on a snowy road.

11. The travel lane marking recognition system according to claim 1, wherein
the at least one state acquisition apparatus includes an environmental condition acquisition apparatus that acquires an environmental condition in a periphery of the own vehicle, and
the reliability level setting unit reduces the reliability level of the travel lane marking when the environmental condition acquired by the environmental condition acquisition apparatus indicates being in a desert.

12. The travel lane marking recognition system according to claim 1, further comprising
a pitch angle calculator unit that calculates a pitch angle of the own vehicle from travel lane markings on both sides of the travel lane when travel lane markings on both sides of the travel lane are recognized by the recognizing unit,
wherein
the at least one state acquisition apparatus includes a vehicle behavior sensor that detects a pitch angle of the own vehicle, and
the reliability level setting unit reduces the reliability level of the travel lane marking when a difference between the pitch angle calculated by the pitch angle calculator unit and the pitch angle detected by vehicle behavior sensor is greater than a third predetermined angle.

13. The travel lane marking recognition system according to claim 12, wherein
the pitch angle calculator unit sets, as a calculated pitch angle, the pitch angle detected by vehicle behavior sensor when a travel lane marking on one side of the travel lane is recognized by the recognizing unit.

14. The travel lane marking recognition system according to claim 1, further comprising:
a branching road determining unit that performs a determination of whether or not a travel lane marking candidate detected from the image by the recognizing unit is a branching road; and
a branching reliability level calculator unit that calculates a reliability level of the determination performed by the branching road determining unit,
wherein
the at least one state acquisition apparatus includes a gradient detection apparatus that detects a gradient of the travel lane, and
the branching reliability level calculator unit reduces the reliability level of the determination performed by the branching road determining unit when the branching road determining unit determines that the travel lane marking candidate is a branching road and when the gradient of the travel lane detected by the gradient detection apparatus is greater than a predetermined gradient.

15. The travel lane marking recognition system according to claim 1, further comprising
a curvature calculator unit that calculates a curvature of the travel lane and a curvature change rate of the travel lane from the travel lane marking recognized by the recognizing unit,
wherein
the at least one state acquisition apparatus includes a roadside object detection apparatus that detects a roadside object in a periphery of the own vehicle, and
the reliability level setting unit reduces the reliability level of the travel lane marking, i) when at least one of a) the curvature calculated by the curvature calculator unit is greater than a first predetermined value and b) the curvature change rate calculated by the curvature calculator unit is greater than a second predetermined value, and ii) when the roadside object is detected, by the roadside object detection apparatus, in a position corresponding to the periphery of the travel lane marking recognized by the recognizing unit.

16. The travel lane marking recognition system according to claim 1, wherein
the at least one state acquisition apparatus is a plurality of state acquisition apparatuses,
the travel lane marking recognition system further comprises an acquired value reliability level calculator unit that calculates reliability levels of acquired values acquired by the plurality of state acquisition apparatuses, and
the reliability level setting unit reduces the reliability level of the travel lane marking when each of the reliability levels of acquired values acquired by the plurality of state acquisition apparatuses is higher than a second predetermined threshold and when states of the own vehicle indicated by the acquired values do not match with one another.

17. The travel lane marking recognition system according to claim 1, wherein
the reliability level setting unit corrects the reliability level of the travel lane marking using information detected from the image.

18. The travel lane marking recognition system according to claim 17, wherein
the reliability level setting unit reduces the reliability level of the travel lane marking when a travel lane marking candidate detected on one side of the travel lane from the image by the recognizing unit is a plurality of travel lane markings.

19. The travel lane marking recognition system according to claim 17, wherein the reliability level setting unit reduces the reliability level of the travel lane marking when the travel lane marking recognized by the recognizing unit is a composite line.

20. The travel lane marking recognition system according to claim 17, further comprising
a curvature calculator unit that calculates a curvature of the travel lane and a curvature change rate of the travel lane from the travel lane marking recognized by the recognizing unit,
wherein
the reliability level setting unit reduces the reliability level of the travel lane marking, when at least one of i) the curvature calculated by the curvature calculator unit is greater than a third predetermined value and ii) the curvature change rate calculated by the curvature calculator unit is greater than a fourth predetermined value.

21. The travel lane marking recognition system according to claim 17, wherein
the reliability level setting unit reduces the reliability level of the travel lane marking when edge points exceeding a predetermined quantity are extracted in a periphery of the travel lane marking recognized by the recognizing unit.

22. The travel lane marking recognition system according to claim 1, wherein
the at least one state acquisition apparatus acquires, as an acquired value, map information of a periphery of the own vehicle.

23. The travel lane marking recognition system according to claim 1, wherein:
the at least one state acquisition apparatus includes an inter-vehicle communication apparatus that receives, from an other vehicle, a position of the other vehicle, and
the reliability level setting unit reduces the reliability level of the travel lane marking in a periphery of the other vehicle when the position of the other vehicle received by the inter-vehicle communication apparatus is a position corresponding to a periphery of the travel lane marking recognized by the recognizing unit.

24. The travel lane marking recognition system according to claim 1, wherein
the at least one state acquisition apparatus includes a road-vehicle communication apparatus that receives, from a roadside apparatus, a position of a solid object in relation to the own vehicle, and
the reliability level setting unit reduces the reliability level of the travel lane marking in a periphery of the position of the solid object when the position of the solid object received by the inter-vehicle communication apparatus lies ahead of the own vehicle in the travel lane.

25. The travel lane marking recognition system according to claim 1, wherein
the reliability level setting unit reduces the reliability level of the travel lane marking when an acquired value indicating a state in which the white line is difficult to recognize the travel lane marking is acquired, by the at least one state acquisition apparatus unit, over a predetermined amount of time so as to amount to more than predetermined percentage.

26. A travel lane marking recognition system comprising:
an on-board camera that captures an image of a travel lane ahead of an own vehicle;
at least one state acquisition apparatus other than the on-board camera that acquires an acquired value indicating a state of the own vehicle;
a recognizing unit that recognizes a travel lane marking that demarcates the travel lane from an image captured by the on-board camera;
a reliability level setting unit that sets a reliability level of the travel lane marking recognized by the recognizing unit based on the acquired value acquired by the state acquisition apparatus; and
a display unit that displays the travel lane marking recognized by the recognizing unit such as to differentiate between a portion of which the reliability level set by the reliability level setting unit is higher than the first predetermined threshold and a portion of which the reliability level is lower than the first threshold, wherein
the at least one state acquisition apparatus includes a solid object detection apparatus that detects a solid object in a periphery of the own vehicle, and
the reliability level setting unit reduces the reliability level of the travel lane marking in a periphery of the solid object when the solid object is detected, by the solid object detection apparatus, in a position corresponding to a periphery of the travel lane marking recognized by the recognizing unit.

* * * * *